(12) United States Patent
Kwon et al.

(10) Patent No.: US 8,411,611 B2
(45) Date of Patent: Apr. 2, 2013

(54) METHOD FOR SETTING PACKET TRANSMISSION PATH IN AD HOC NETWORK, AND NETWORK APPARATUS USING THE SAME

(75) Inventors: Tae Soo Kwon, Hwaseong-si (KR); Young-Doo Kim, Seoul (KR); Eung Sun Kim, Suwon-si (KR); Yong Hoon Lee, Daejeon (KR); Sae-Young Chung, Daejeon (KR); Heejung Yu, Daejeon (KR); Won-Yong Shin, Yongin-si (KR)

(73) Assignees: Samsung Electronics Co., Ltd, Suwon-si (KR); Korea Advanced Institute of Science and Technology, Daejeon (KR)

( * ) Notice: Subject to any disclaimer, the term of this patent is extended or adjusted under 35 U.S.C. 154(b) by 754 days.

(21) Appl. No.: 12/166,875

(22) Filed: Jul. 2, 2008

(65) Prior Publication Data
US 2009/0097432 A1 Apr. 16, 2009

(30) Foreign Application Priority Data

Oct. 12, 2007 (KR) .................. 10-2007-0103199

(51) Int. Cl.
*H04B 7/14* (2006.01)
(52) U.S. Cl. ............................................. 370/315
(58) Field of Classification Search ............. 370/315
See application file for complete search history.

(56) References Cited

U.S. PATENT DOCUMENTS

| 7,075,890 B2 * | 7/2006 | Ozer et al. ............. 370/230 |
| 7,085,290 B2 | 8/2006 | Cain et al. |

(Continued)

FOREIGN PATENT DOCUMENTS

| JP | 2005-160062 | 6/2005 |
| KR | 1020070074163 A | 7/2007 |

(Continued)

OTHER PUBLICATIONS

Shah, R.C.; Bonivento, A.; Petrovic, D.; Lin, E.; van Greunen, J.; Rabaey, J.; , "Joint optimization of a protocol stack for sensor networks," Military Communications Conference, 2004. MILCOM 2004. IEEE , vol. 1, no., pp. 480-486 vol. 1, Oct. 31-Nov. 3, 2004.*

(Continued)

*Primary Examiner* — Derrick Ferris
*Assistant Examiner* — Kodzovi Acolatse
(74) *Attorney, Agent, or Firm* — NSIP Law

(57) ABSTRACT

A method of setting a packet transmission path in a wireless communication network and a network apparatus using the same are provided. A method of setting a packet transmission path includes setting N−1 routing regions including at least one node between a source node and a destination node based on a predetermined N number of hops, N denoting an integer greater than or equal to two, and determining a node in each of the routing regions as a relay node based on a channel gain.

19 Claims, 11 Drawing Sheets

U.S. PATENT DOCUMENTS

| | | | |
|---|---|---|---|
| 7,177,295 B1* | 2/2007 | Sholander et al. | 370/338 |
| 7,233,582 B2* | 6/2007 | Tamaki et al. | 370/332 |
| 7,437,182 B2* | 10/2008 | Lee et al. | 455/562.1 |
| 7,697,449 B1* | 4/2010 | Shirali et al. | 370/252 |
| 2003/0123419 A1* | 7/2003 | Rangnekar et al. | 370/338 |
| 2005/0185632 A1 | 8/2005 | Draves et al. | |
| 2006/0153157 A1* | 7/2006 | Roh et al. | 370/338 |
| 2006/0182126 A1 | 8/2006 | Yuen et al. | |
| 2006/0221999 A1* | 10/2006 | Bachrach et al. | 370/465 |
| 2008/0002640 A1* | 1/2008 | Westphal | 370/338 |
| 2008/0063106 A1* | 3/2008 | Hahm et al. | 375/267 |
| 2010/0322223 A1* | 12/2010 | Choi et al. | 370/342 |

FOREIGN PATENT DOCUMENTS

WO    WO 2005/027544 A1    3/2005

OTHER PUBLICATIONS

Jianfeng Wang; Hongqiang Zhai; Yuguang Fang; , "Opportunistic packet Scheduling and Media Access control for wireless LANs and multi-hop ad hoc networks," Wireless Communications and Networking Conference, 2004. WCNC. 2004 IEEE , vol. 2, no., pp. 1234-1239 vol. 2, Mar. 21-25, 2004.*

Zorzi, M.; Rao, R.R.; , "Geographic random forwarding (GeRaF) for ad hoc and sensor networks: multihop performance," Mobile Computing, IEEE Transactions on , vol. 2, No. 4, pp. 337-348, Oct.-Dec. 2003.*

Jason A. Fuemmeler, Nitin H. Vaidya and Venugopal V. Veeravalli, "Selecting Transmit Powers and Carrier Sense Thresholds in CSMA Protocols for Wireless Ad Hoc Networks", WICON'06, The 2nd Annual International Wireless Internet Conference, Aug. 2-5, 2006, Boston, MA.*

Jian Tang, Bin Hao, Arunabha Sen, Relay node placement in large scale wireless sensor networks, Computer Communications, vol. 29, Issue 4, Current areas of interest in wireless sensor networks designs, Feb. 20, 2006, pp. 490-501 (http://www.sciencedirect.com/science/article/pii/S01403664050).*

Laneman, J.N.; Tse, D.N.C.; Wornell, G.W.; , "Cooperative diversity in wireless networks: Efficient protocols and outage behavior," Information Theory, IEEE Transactions on , vol. 50, No. 12, pp. 3062-3080, Dec. 2004 doi: 10.1109/TIT.2004.838089.*

Bletsas, A.; Khisti, A.; Reed, D.P.; Lippman, A.; , "A simple Cooperative diversity method based on network path selection," Selected Areas in Communications, IEEE Journal on , vol. 24, No. 3, pp. 659-672, Mar. 2006 doi: 10.1109/JSAC.2005.862417.*

Chinese Office Action issued on Nov. 10, 2011, in counterpart Chinese Patent Application No. 200810212777.9 (4pp.).

Shah, R. C., et al., "Joint Optimization of a Protocol Stack for Sensor Networks", 2004 IEEE Military Communications Conference (MILCOM 2004), Oct. 31-Nov. 3, 2004, pp. 480-486, vol. 1.

Wang, Jianfeng, et al., "Opportunistic Packet Scheduling and Media Access Control for Wireless LANs and Multi-hop Ad Hoc Networks", 2004 IEEE Wireless Communications and Networking Conference, Mar. 21-25, 2004, pp. 1234-1239, vol. 2.

* cited by examiner

METHOD FOR SETTING PACKET TRANSMISSION PATH IN AD HOC NETWORK, AND NETWORK APPARATUS USING THE SAME

CROSS-REFERENCE TO RELATED APPLICATION

This application claims the benefit under 35 U.S.C. §119 (a) of a Korean Patent Application No. 10-2007-0103199, filed on Oct. 12, 2007, in the Korean Intellectual Property Office, the entire disclosure of which is incorporated herein by reference.

TECHNICAL FIELD

The following description relates to setting a packet transmission path in a wireless communication network, and more particularly, to a method of optimizing a packet transmission path in an ad hoc network and a network apparatus using the same.

BACKGROUND

An ad hoc network may communicate with each other using multi-hop routing among the nodes, without the help of a specific base network. In a wireless communication network, bandwidth may be restricted and low energy use may be required.

A routing protocol in a wireless communication network, and more particularly, an ad hoc network, may determine an efficient packet transmission path from a source node to a destination node.

According to a conventional routing method in an ad hoc network, a node closest to a destination node from among nodes having received a transmission packet from either a source node or a relay node may become a transmission node in a subsequent hop, and thus forwards the transmission packet to the destination node. The routing method may reduce an overall number of hops in order to transmit the transmission packet to the destination node from the source node.

However, where a plurality of Source node-Destination node pairs (S-D pairs) exists in a network, there exists a strong possibility that the conventional routing method will cause a collision between packet transmission paths.

Furthermore, the source node may require a high transmission power to send a transmission packet to a node close to the destination node. Accordingly, the conventional routing method may not be applied to an ad hoc network where power is restricted.

SUMMARY

In one general aspect, there is provided a method of setting a packet transmission path and a network apparatus using the method, which determines a relay node to transmit a packet between a source node and a destination node in a wireless communication network such as a multi-hop-based ad hoc network.

In another general aspect, there is provided an opportunistic method of setting a packet transmission path based on a channel gain and a network apparatus using the method.

In still another general aspect, there is provided a method of setting a packet transmission path and a network apparatus using the method, which sets a number of hops based on packet delay and sets a routing region based on the set number of hops.

In still another general aspect, there is provided a method of setting a packet transmission path and a network apparatus using the method, which provides an efficient tradeoff between packet delay and transmission power.

In yet another general aspect, a method of setting a packet transmission path includes setting N−1 routing regions including at least one node between a source node and a destination node based on a predetermined N number of hops, N denoting an integer greater than or equal to two and determining a node in the routing regions as a relay node based on a channel gain. The wireless communication network may be a multi-hop-based ad hoc network.

The predetermined N number of hops may be determined based on a delay time permitted with respect to a packet to be transmitted.

A ratio of a distance from a center of each of the N−1 routing regions to a boundary to a hop distance with respect to a packet to be transmitted may be set to be a random value greater than 0 and less than 0.5.

The source node and the relay node may determine transmission power based on the predetermined N number of hops, the hop distance, and the distance from the center of each of the N−1 routing regions to the boundary.

Either the source node or the relay node, having received a packet transmitted from the source node, may transmit a control signal including coordinate information of the destination node to each node in an adjacent routing region, and a node having received the control signal may estimate the channel gain, and a node in which the estimated channel gain is greater than a predetermined value may be determined as a subsequent relay node.

The determining of the relay node may comprise, transmitting by the destination node a Request To Send (RTS) functional message to each node in a routing region adjacent to the destination node, estimating a channel gain by each node having received the RTS functional message, and determining a node in which the estimated channel gain is greater than a predetermined value as the relay node.

In still another general aspect, a method of setting a packet transmission path to determine a relay node transmitting a packet between a source node and a destination node in a wireless communication, includes transmitting, by either the source node or a first relay node transmitting the packet received from the source node, an RTS message to nodes located in a predetermined region, and determining a node having transmitted a CTS message as a second relay node, wherein the CTS message includes an estimated channel gain greater than a predetermined value, and a channel gain being estimated by each node having received the RTS message. The determining of the second relay node may comprise determining the node having transmitted the CTS message as the second relay node in response to the CTS message being transmitted by a single node.

In response to no node transmitting the CTS message, the predetermined value may be changed so as to compare a channel gain being estimated with the changed predetermined value.

The method may further comprise in response to at least two nodes transmitting the CTS message, receiving a retransmitted CTS message based on a probability value corresponding to the channel gain, from each node having transmitted the CTS message.

Where a node in the predetermined region receives the RTS message from either at least two source nodes or the first relay node, a channel gain with respect to each RTS message may be estimated by the node receiving the RTS message from either the at least two source nodes or the first relay node, and where the estimated channel gain is greater than the predetermined value, the CTS message being transmitted may include identification information of either the source node having transmitted the RTS message or the first relay node.

In still another general aspect, a method of setting a packet transmission path to determine a relay node transmitting a packet between a source node and a destination node in a wireless communication, includes transmitting, by either the source node or a first relay node transmitting the packet received from the source node, an RTS message to nodes located in a predetermined region, and determining a node having first transmitted a CTS message as a second relay node, wherein the CTS message includes an estimated channel gain based on a back-off time corresponding to the estimated channel gain, and a channel gain being estimated by each node having received the RTS message.

Where a node in the predetermined region receives the RTS message from either at least two source nodes or the first relay node, a channel gain with respect to each RTS message may be estimated by the node receiving the RTS message from either the at least two source nodes or the first relay node, and the CTS message including identification information of either the source node having transmitted the RTS message or the first relay node, may be transmitted based on the back-off time corresponding to the estimated channel gain.

In still another general aspect a network apparatus includes a source node which determines a number of hops based on a delay time permitted in a transmission packet, a first relay node which receives a control signal including coordinate information of a destination node from the source node, estimates a channel gain, and transmits a response message to the source node where the estimated channel gain is greater than a predetermined value, and a second relay node which receives a message from the destination node, estimates a channel gain, and transmits a response message to the destination node where the estimated channel gain is greater than a predetermined value.

The first relay node and the second relay node may be respectively located in different predetermined routing regions based on the number of hops.

The first relay node may transmit the response message based on the back-off time corresponding to the estimated channel gain.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures. The thicknesses of elements may be exaggerated for clarity and convenience.

DETAILED DESCRIPTION

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, description of well-known functions and constructions are omitted to increase clarity and conciseness.

Figure 1:
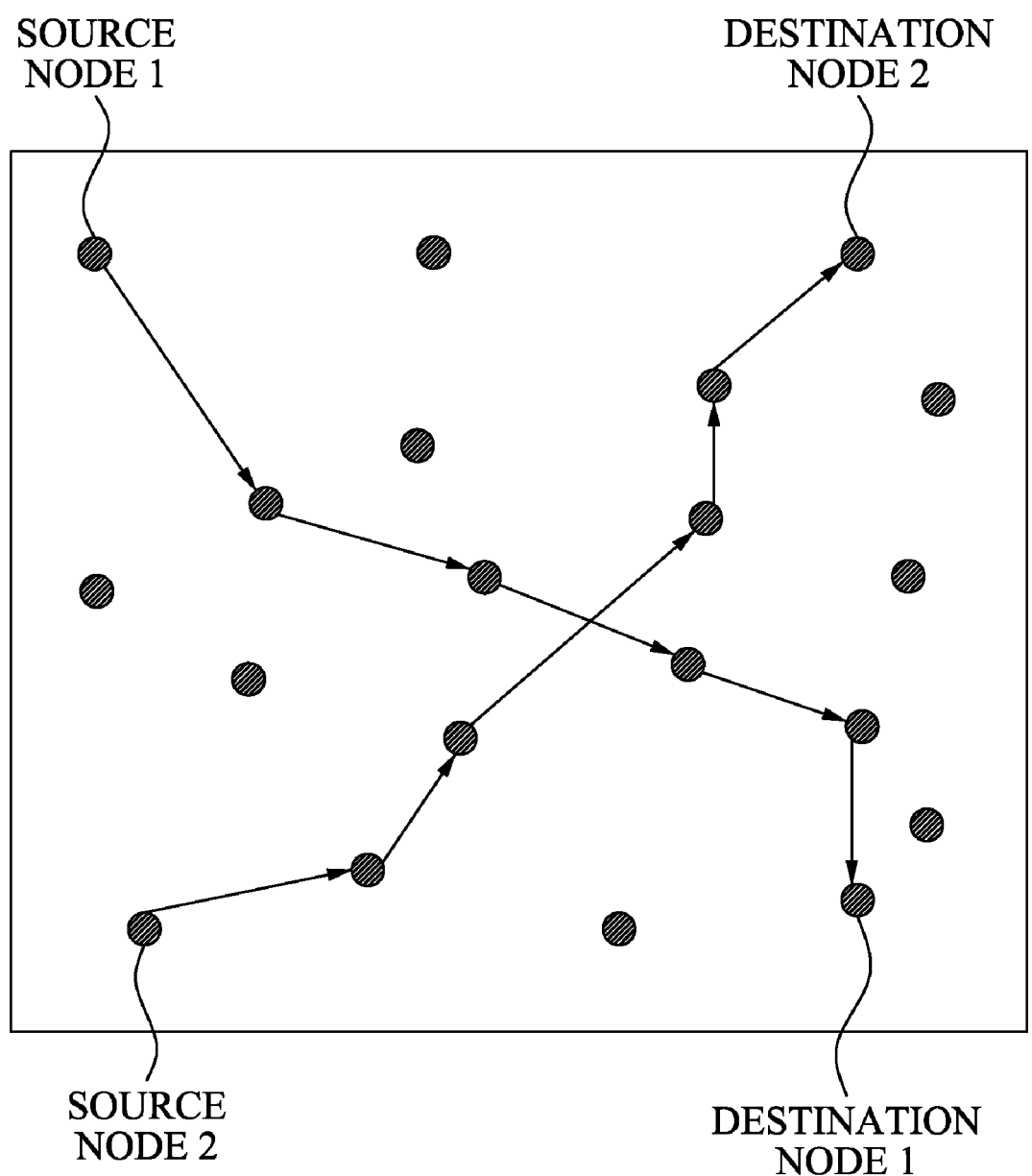
FIG. 1 is a configuration diagram illustrating an ad hoc network according to an exemplary embodiment.

FIG. 1 illustrates an ad hoc network according to an exemplary embodiment. As illustrated in FIG. 1, n nodes are randomly distributed in the ad hoc network. The n random S-D pairs or less may exist in the ad hoc network. Referring to FIG. 1, a source node 1 to a destination node 1 and a source node 2 to a destination node 2 illustrate an example of routing generated by a multi-hop communication.

In the following descriptions, while not limited thereto, a channel model of the ad hoc network may be defined in accordance with Equation 1.

$$y_j = \sum_{i \in I} h_{ij} x_i + n_j \text{ where } h_{ij} = \frac{g_{ij}}{r_{ij}^{\gamma/2}}, \quad \text{[Equation 1]}$$

where $g_{ij}$ denotes a Rayleigh fading channel in accordance with $E[|g_{ij}|^2]=1$. $\gamma$ denotes a path loss exponent and is assumed to be greater than two. It is assumed that a transmitter including a source node may be unaware of channel state information and a receiver may measure the channel state information.

Figure 2:
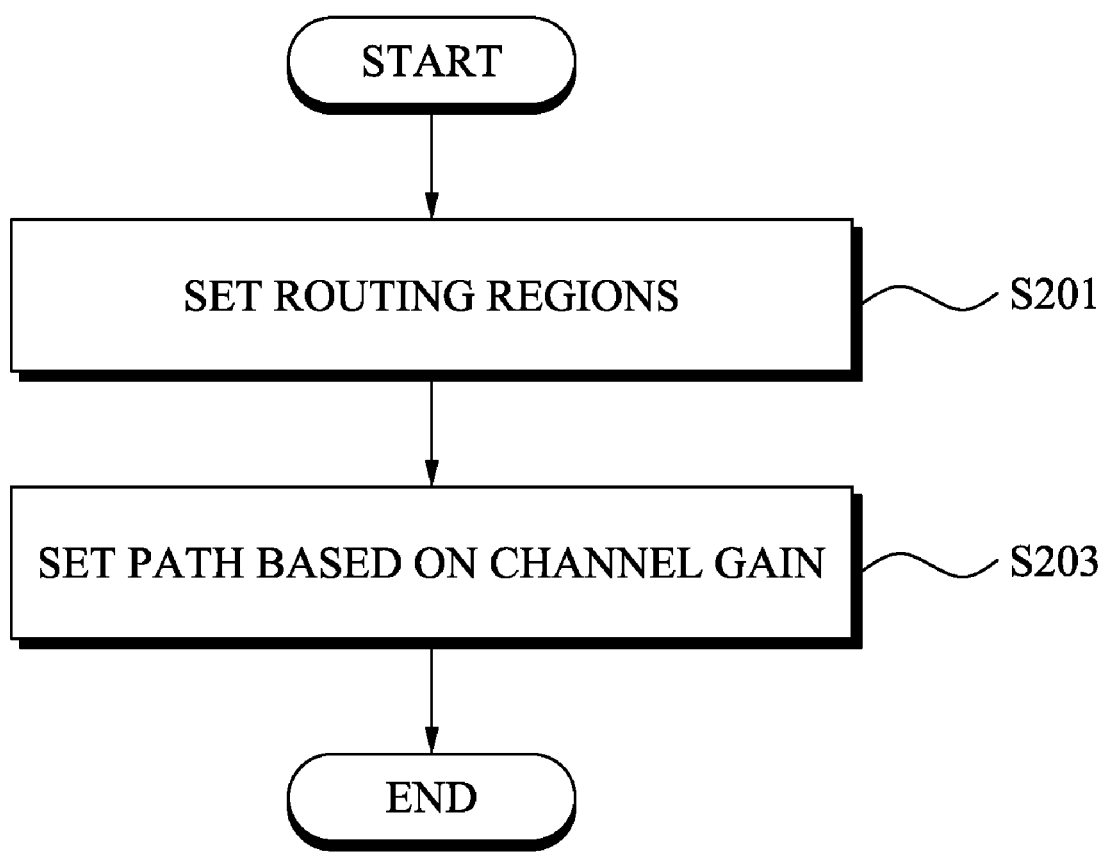
FIG. 2 is a flowchart illustrating a method of setting a packet transmission path according to an exemplary embodiment.

FIG. 2 illustrates a method of setting a packet transmission path according to an exemplary embodiment.

Referring to FIG. 2, the method includes setting N−1 routing regions including at least one node between a source node and a destination node based on a predetermined N number of hops in operation S201, wherein N denoting an integer greater than or equal to two, and determining a node in the routing regions as a packet relay node based on a channel gain.

In the operation S201, the N number of hops may be determined by the source node based on a delay time permitted with respect to a packet to be transmitted. The delay time permitted with respect to the packet to be transmitted may be set based on a system volume, average transmission power per Source node-Destination node pair (S-D pair), and the like. Accordingly, as the delay time permitted with respect to the packet to be transmitted decreases, the number of hops may decrease.

Figure 3:
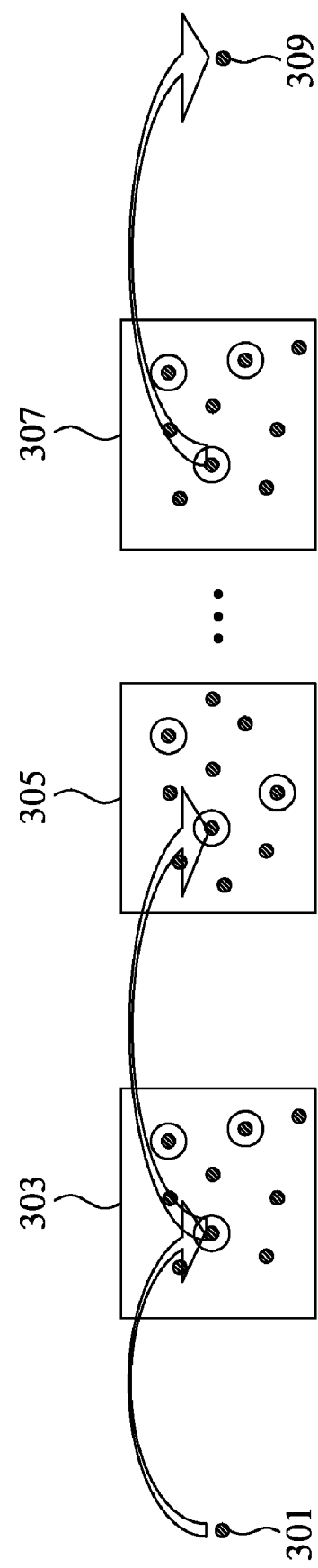
FIG. 3 is a diagram illustrating a method of setting routing regions according to an exemplary embodiment.

FIG. 3 illustrates a method of setting routing regions according to an exemplary embodiment.

As illustrated in FIG. 3, the routing regions 303, 305, and 307 are set between a source node 301 and a destination node 309. Each of the routing regions 303, 305, and 307 includes at least one node.

The source node 301 may determine a node in the adjacent routing region 303 as a packet receiving node in a first hop, wherein the determined node may be one of the nodes in the adjacent routing region 303 having a channel gain greater than a predetermined value. The packet receiving node in the first hop becomes a relay node in a subsequent hop (a second hop). The relay node determined in the second hop may determine a node in the adjacent routing region 305 as a relay node in a subsequent hop (a third hop), wherein the relay node in the third hop may be one of the nodes in the adjacent routing region 305 having a channel gain greater than a predetermined value.

As described above, a node having a higher channel gain, for example, a channel gain greater than a predetermined value, in a routing region may be selected as a relay node, thereby acquiring a Multi-User Diversity (MUD) gain. The MUD gain may be equal to a logarithm of a number of nodes in the routing region 303.

As a sufficient number of nodes exist in the routing regions 303, 305, and 307, a node having a higher channel gain may be selected.

Accordingly, a transmission node may reduce transmission power corresponding to the channel gain. Reduction of the transmission power may admit more S-D pairs, and increase a volume of an entire system.

The routing region 307 adjacent to the destination node 309 may determine a node in which a channel gain of a signal received from the destination node 309 is greater than a predetermined value, as a relay node.

Accordingly, the relay node preceding the destination node 309 by two hops transmits a packet to the relay node in the routing region 307.

Figure 4:
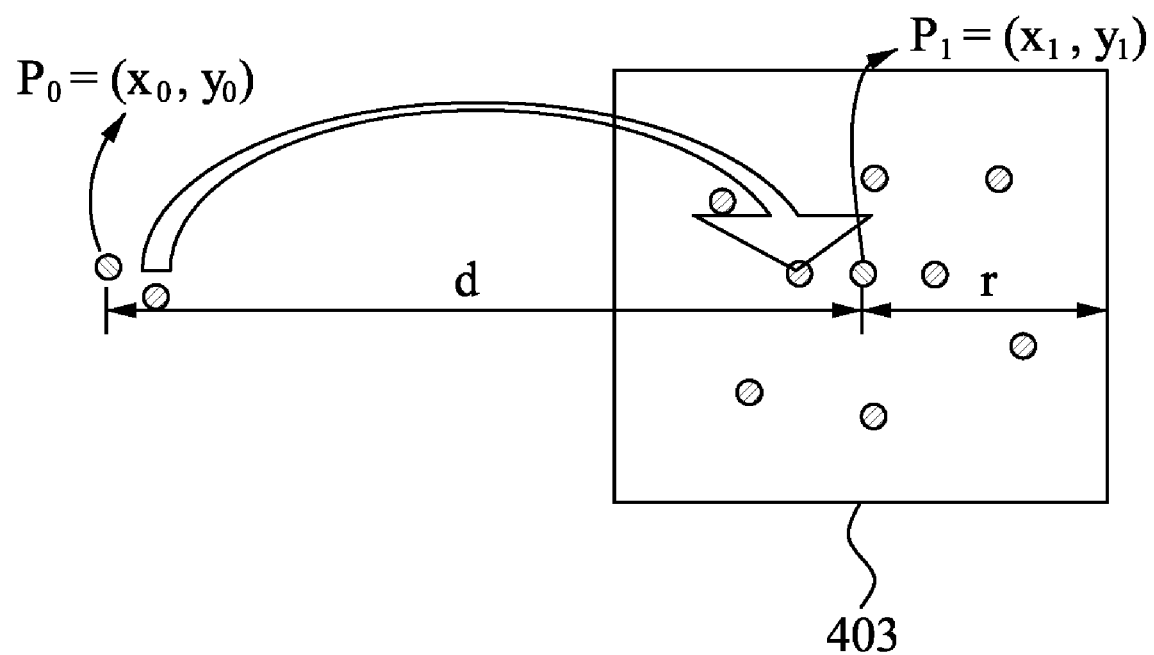
FIG. 4 is a diagram illustrating a method of determining a routing region according to an exemplary embodiment.

FIG. 4 illustrates an exemplary method of determining a routing region, for example, each of the routing regions illustrated in FIG. 3.

It is understood that while a routing region 403 in FIG. 4 is set in a form of a square, it is not limited thereto. A size of the routing region 403 may be related to Equation 2:

$$r = \alpha d, \quad \text{[Equation 2]}$$

where $\alpha$ is in a range of $0 < \alpha < \frac{1}{2}$, r denotes a distance from a center $(x_1, y_1)$ of the routing region 403 to a boundary, and d denotes a hop distance. d and r may be predetermined based on a required condition of a network.

d denotes either a distance from a packet transmission node (either a source node or a relay node) to a relay node in the adjacent routing region 403, or a distance from a center of a previous routing region $(x_0, y_0)$ to a center of a subsequent routing region $(x_1, y_1)$.

Since hopping to the adjacent node may cause interference, r may be set to be even shorter than d. Since the hop distance d is even longer than r, d may be assumed to have an equivalent value for each hop.

Each node in an ad hoc network may be aware of coordinate information of each node using a Global Positioning System (GPS) device. Accordingly, each node may be aware of information about which routing region includes each node and information about d and r.

Referring to FIG. 3, the source node 301 and each relay node may set transmission power based on the predetermined N number of hops, the hop distance d, and the distance r from the center of the routing region to the boundary. Where the hop distance is set to be long, the transmission power is set to be high corresponding to the hop distance, and where the hop distance is set to be short, the N number of hops may be set to be high, however, the transmission power may set to be low corresponding to the hop distance.

Figure 5:
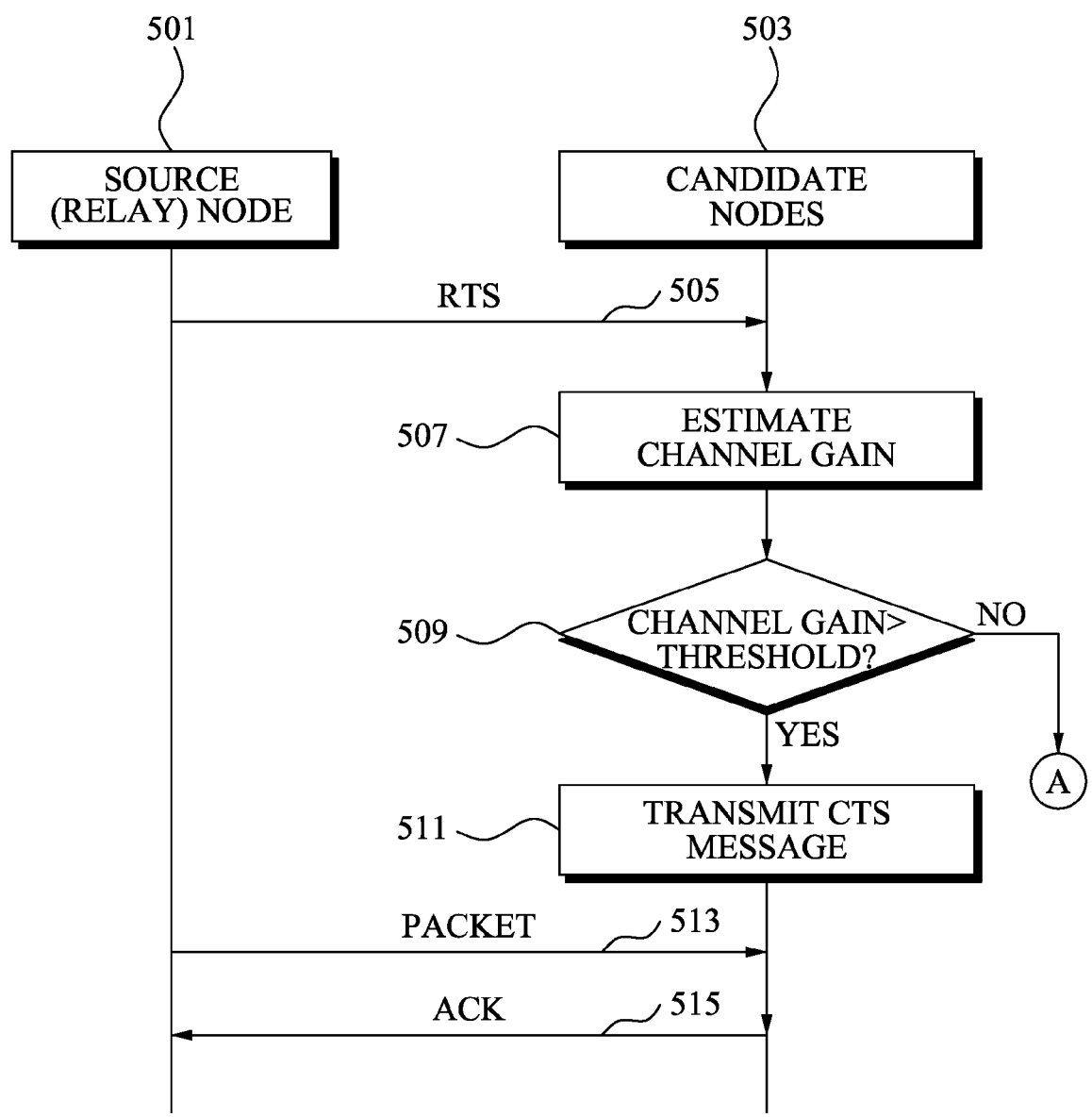
FIG. 5 is a flowchart illustrating a method of setting a packet transmission path according to another exemplary embodiment.

FIG. 5 illustrates a method of setting a packet transmission path according to another exemplary embodiment.

Referring to FIG. 5, the method includes transmitting, by either a source node or a first relay node 501 transmitting a packet received from the source node, a Request To Send (RTS) message to candidate nodes 503 located in a predetermined region in operation 505, estimating, by each candidate node having received the RTS message, a channel gain in operation 507, transmitting in operation 511, by a candidate node in which the estimated channel gain is greater than a predetermined value in operation 509, a Clear To Send (CTS) message including the estimated channel gain, determining a candidate node having transmitted the CTS message as a second relay node, where a single node transmitting the CTS message exists, and transmitting the packet in operation 513, and transmitting, by the single node having transmitted the CTS message, an Acknowledgment (ACK) message in operation 515.

In the operation 505, the source node (or the first relay node) 501 may transmit the RTS message including coordinate information of a destination node to each node (each candidate node) 503 in an adjacent routing region.

In the operation 507, each candidate node 503 in the routing region may estimate the channel gain using the RTS message.

The RTS message and the CTS message may be transmitted using a random frequency different from a frequency used for transmitting the packet.

In the operation 509, each node may determine whether the estimated channel gain is greater than a threshold. In the operation 511, the node in which the channel gain is greater than the threshold transmits the CTS message including the estimated channel gain to the source node (or the first relay node) 501.

The threshold may be in accordance with Equation 3:

$$\gamma_{TH,i} \triangleq \log m - \epsilon_i, \quad \text{[Equation 3]}$$

where m denotes a number of nodes existing in a routing region. Where m is assumed to be sufficient, the highest channel gain is theoretically equivalent to log(m).

However, when considering actual m, an error with respect to the channel gain $\epsilon_i (\epsilon_i > 0)$ may occur. An overall $T_{TH}$ number of thresholds may be set, and the error with respect to the channel gain $\epsilon_i$ may be in accordance with $0 < \epsilon_1 < \epsilon_2 < \ldots < \epsilon_{T_{TH}}$.

In the operation 513, the source node (or the first relay node) 501 may determine the node having transmitted the CTS message as a relay node in a subsequent hop, and transmits the packet.

In the operation 515, the node having transmitted the CTS message transmits the ACK message where the packet is received.

Where no node transmits the CTS message for a predetermined time slot, the threshold may be changed to $\gamma_{TH,i+1}$.

Figure 6:
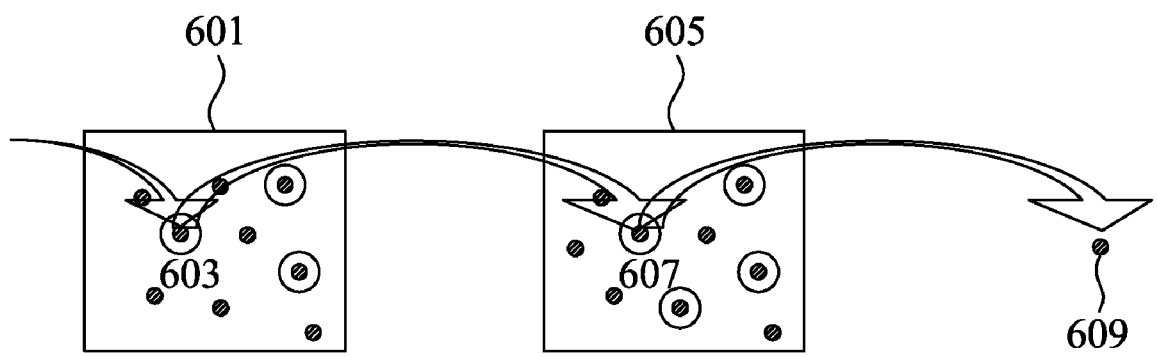
FIG. 6 is a diagram illustrating a method of selecting a relay node according to an exemplary embodiment.

FIG. 6 illustrates a method of selecting a relay node to transmit a packet to a destination node 609 according to an exemplary embodiment.

Referring to FIG. 6, since the destination node 609 may be predetermined, selection of a relay node in a routing region 605 adjacent to the destination node 609 may be determined based on a receiving diversity gain.

A relay node 603 preceding the destination node 609 by two hops transmits a relay node determination request message to a representative node 607 in the routing region 605 adjacent to the destination node 609.

The relay node 603 preceding the destination node 609 by two hops exists in an N−2-th routing region 601. Here, N denotes a predetermined number of hops. The routing region 605 adjacent to the destination node 609 denotes an N−1-th routing region.

The representative node 607 having received the relay node determination request message transmits the relay node determination request message to the destination node 609.

Where the destination node 609 receives the relay node determination request message, the destination node 609 transmits an RTS functional message to each node in the adjacent routing region 605.

The RTS functional message is transmitted by the destination node for path setting. Generally, an RTS message is a message transmitted by a node transmitting data. The RTS functional message has the same function as the RTS message excluding that the destination node transmits the RTS functional message for path setting.

Each node having received the RTS functional message estimates a channel gain based on the received RTS functional message. A node in which the estimated channel gain is greater than a predetermined value may transmit a CTS functional message including the estimated channel gain to the destination node 609.

The CTS functional message may correspond to the RTS functional message. Accordingly, the CTS functional message has the same function as a CTS message excluding that the node for transmitting the data transmits the CTS functional message to the destination node.

The representative node 607 subsequently notifies a node having transmitted the CTS functional message to the destination node 609 (a relay node in a final hop) to the relay node 603 preceding the destination node 609 by two hops.

The relay node 603 preceding the destination node 609 by two hops transmits the packet to the relay node in the final hop.

A change process of a threshold and a collision prevention process of a CTS functional message may be similarly applied to a process of determining a relay node in the final hop.

Figure 7:
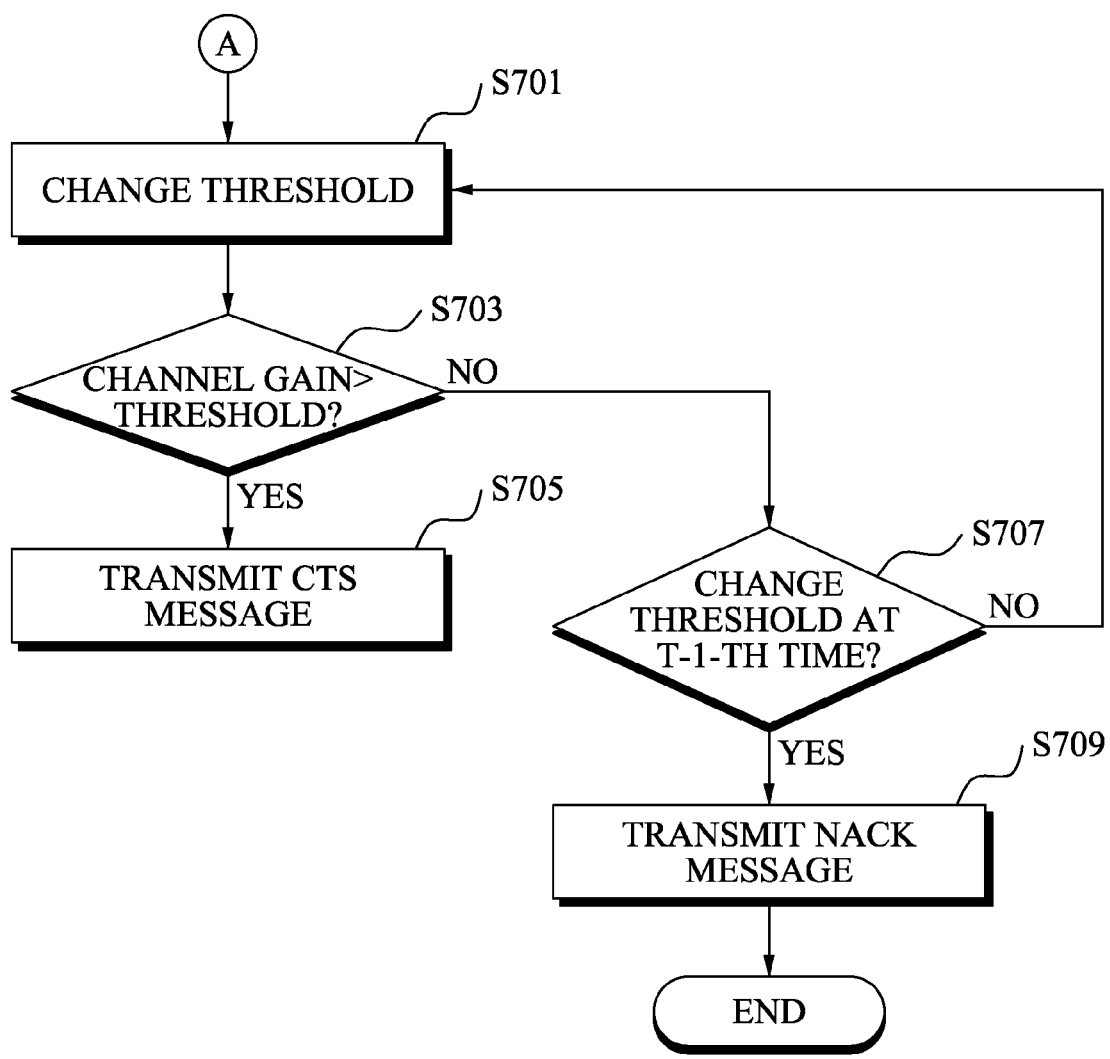
FIG. 7 is a flowchart illustrating a method of setting a packet transmission path where no node transmits a Clear To Send (CTS) message in FIG. 5.

FIG. 7 illustrates an exemplary method of setting a packet transmission path where no node transmits a CTS message in FIG. 5.

Referring to FIGS. 5 and 7, in operation S701, where a node transmitting a CTS message for a predetermined time slot does not exist, a threshold value is changed. Where the CTS message is not received within the predetermined time slot, the source node (or the first relay node) 501 changes the threshold value into $\gamma_{TH,i+1}$, and transmits an RTS message including the changed threshold value $\gamma_{TH,i+1}$.

In operation S703, each node (each candidate node) 503 in an adjacent routing region compares the changed threshold value $\gamma_{TH,i+1}$ and an estimated channel gain. In operation S705, a node in which the estimated channel gain is greater than the changed threshold value $\gamma_{TH,i+1}$ transmits the CTS message. In operation S707, where the CTS message is not transmitted even where the threshold is changed at a T−1-th time, node determination failure (outage) occurs. In operation S709, where the node determination failure (outage) occurs, a representative node in the routing region transmits a Negative Acknowledgment (NACK) message. The representative node in the routing region may be either a node located in a center of the routing region or a predetermined coordinate node.

Where at least two nodes transmit the CTS message, a collision may occur.

Figure 8:
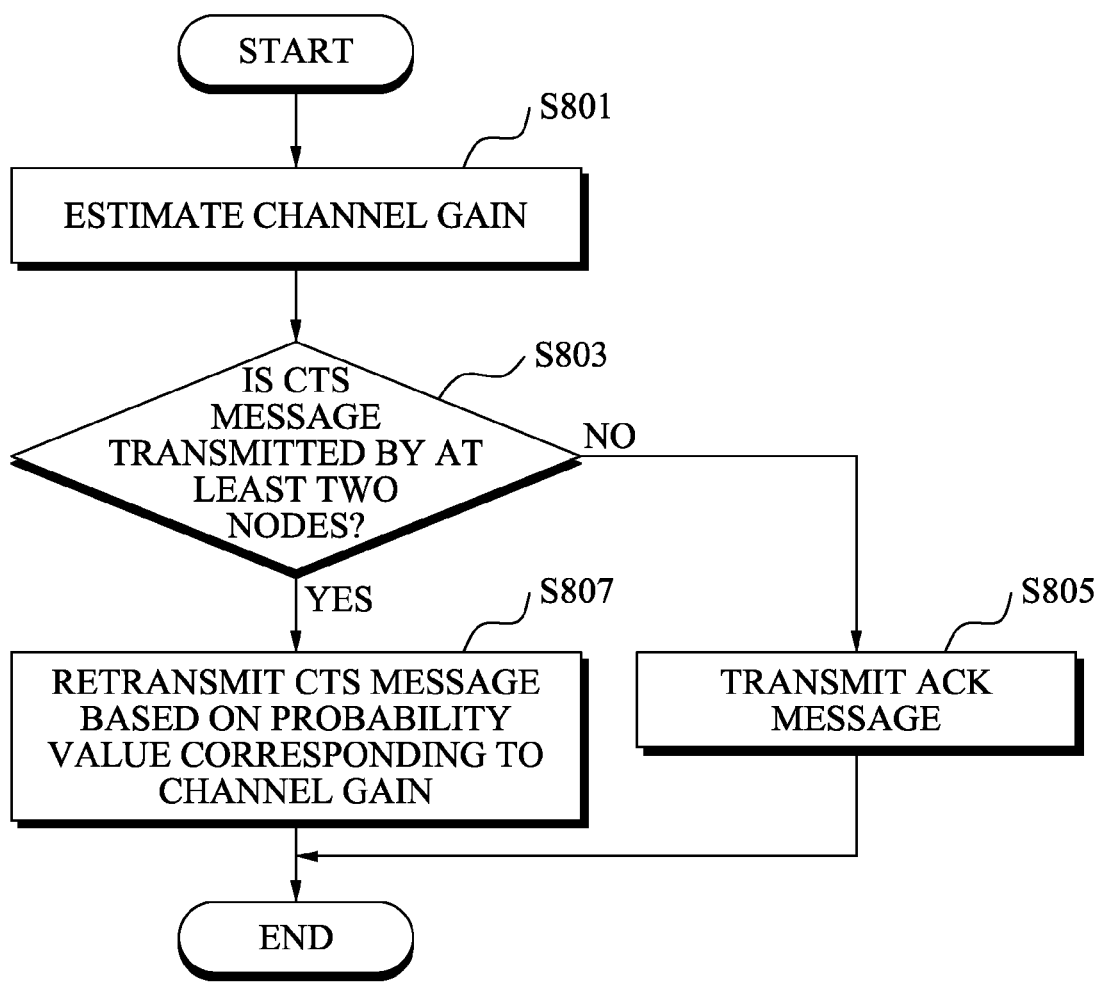
FIG. 8 is a flowchart illustrating a method of setting a packet transmission path where at least two nodes transmit a CTS message according to an exemplary embodiment.

FIG. 8 illustrates a method of setting a packet transmission path where at least two nodes transmit a CTS message according to an exemplary embodiment.

Referring to FIGS. 5 and 8, in operation S801, each candidate node 503 in a routing region estimates a channel gain using an RTS message.

A node in which the estimated channel gain is greater than a threshold may transmit a CTS message to a source node (or a first relay node) 501.

In operation S803, the node having transmitted the CTS message determines whether the CTS message is transmitted by at least two nodes in the routing region. A representative node in the routing region may determine whether the CTS message is transmitted by the at least two nodes, and report this condition to each node having transmitted the CTS message.

In operation S805, where a single node transmits the CTS message to the source node (or the first relay node) 501, an ACK message is transmitted and a relay node (or a second relay node) may be determined.

In operation S807, where the at least two nodes transmits the CTS message to the source node (or the first relay node) 501, each node having transmitted the CTS message retransmits the CTS message based on a probability value corresponding to the channel gain.

The probability value corresponding to the channel gain may be a predetermined value, and as the channel gain increases, the probability value may be set to be close to 1.

Since each node having transmitted the CTS message retransmits the CTS message using the increased probability value as the channel gain increases, a collision of the CTS messages may be prevented.

Figure 9:
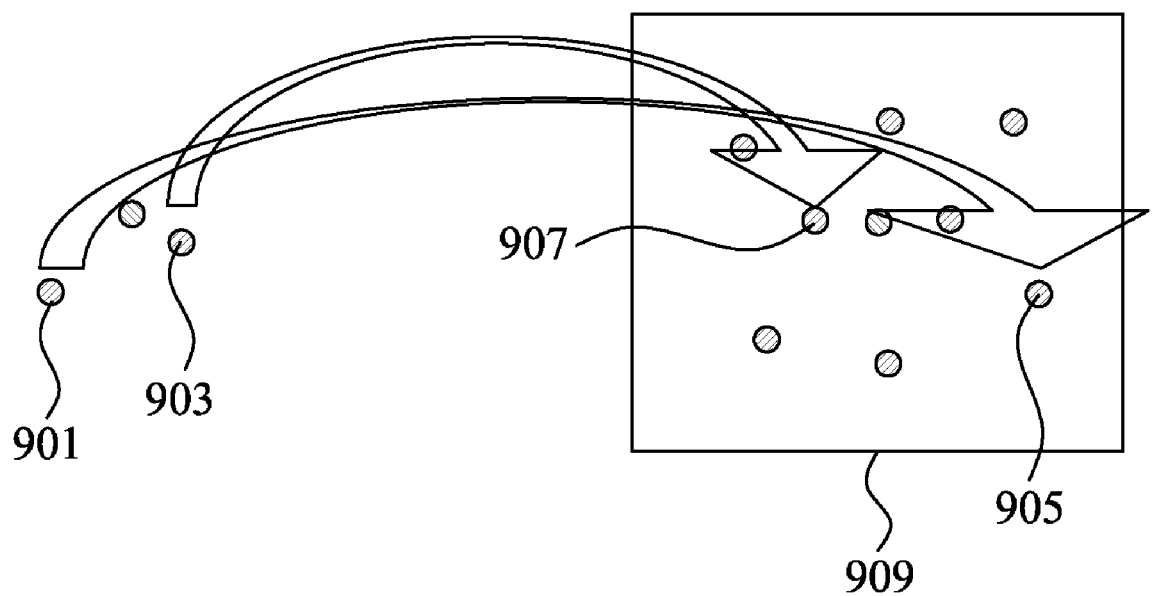
FIG. 9 is a diagram illustrating an ad hoc network having a plurality of transmission nodes according to an exemplary embodiment.

FIG. 9 illustrates a case where a plurality of transmission nodes exists according to an exemplary embodiment.

Referring to FIG. 9, nodes 905 and 907 in a routing region 909 receive an RTS message from at least two transmission nodes 901 and 903.

The nodes 905 and 907 in the routing region 909 may estimate a channel gain with respect to each RTS message.

Where the estimated channel gain is greater than a predetermined value, a CTS message including identification information (ID) of either a source node having transmitted the RTS message or a first relay node and the estimated channel gain is transmitted to the each transmission node 901 and 903.

Each transmission node 901 and 903 may be aware of a node having transmitted the CTS message using the ID. Since any one node may be selected as a candidate node having a highest channel gain, and another node may be selected as a node having a second highest node, each transmission node 901 and 903 may prevent a collision between links.

Where the plurality of nodes exists, a process of addressing a collision of a threshold and a CTS message may be performed similarly to a case where a single transmission node exists.

Figure 10:
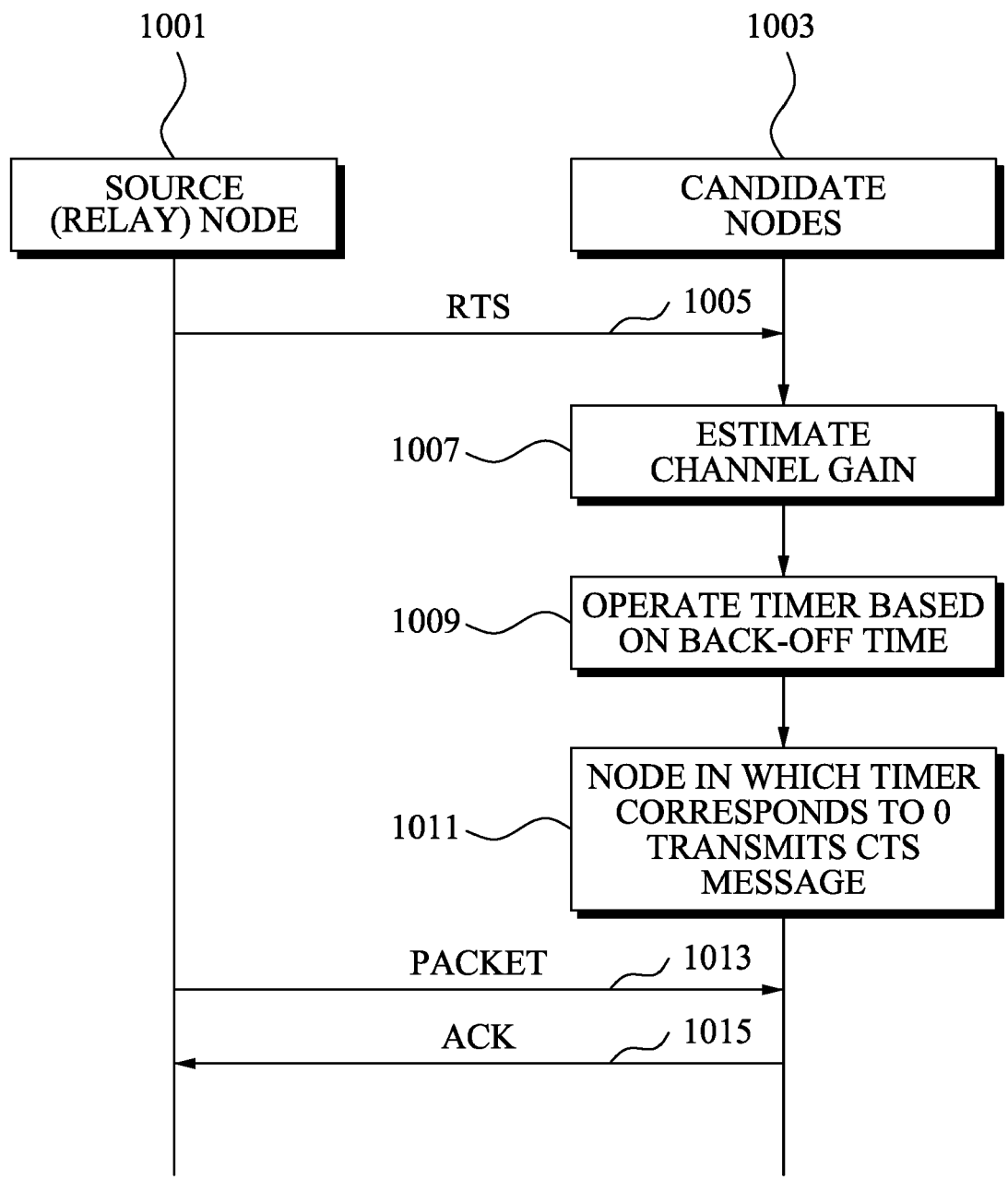
FIG. 10 is a flowchart illustrating a method of setting a packet transmission path according to still another exemplary embodiment.

FIG. 10 illustrates a method of setting a packet transmission path according to still another exemplary embodiment.

Referring to FIG. 10, the method includes transmitting, by either a source node or a first relay node 1001 transmitting a packet received from the source node, an RTS message to candidate nodes 1003 located in a predetermined region in operation 1005, estimating, by each candidate node having received the RTS message, a channel gain in operation 1007, transmitting a CTS message including the estimated channel gain based on a back-off time corresponding to the estimated channel gain in operations 1009 and 1011, and determining a node having first transmitted the CTS message as a relay node or a second relay node in operations 1013 and 1015.

In the operation 1005, the source node (or the first relay node) 1001 transmits the RTS message including coordinate information of a destination node to each node (each candidate node) 1003 in an adjacent routing region.

In the operation 1007, each candidate node 1003 in the adjacent routing region estimates the channel gain using the RTS message.

The RTS message and the CTS message may be transmitted using a random frequency different from a frequency used for transmitting the packet.

In the operation 1009, each node in the adjacent routing region operates a timer (not shown) based on a predetermined back-off time.

Figure 11:
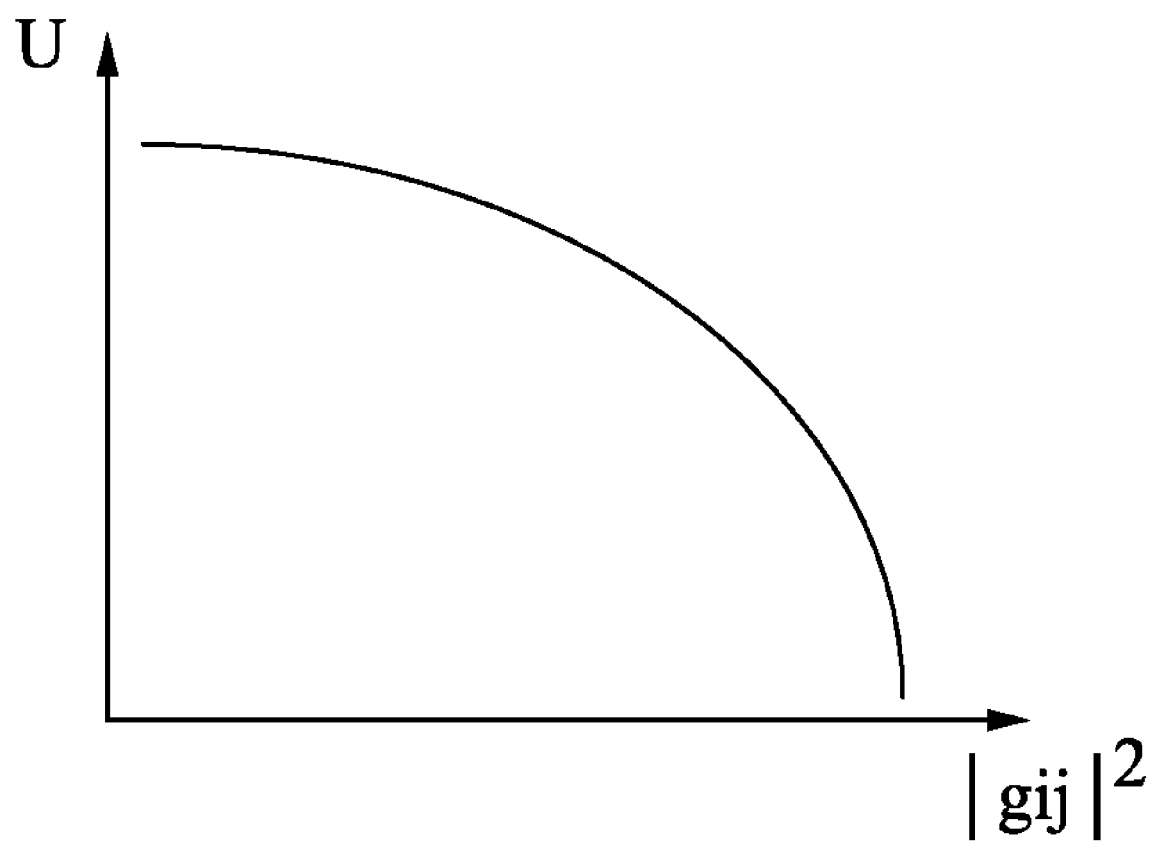
FIG. 11 is a diagram illustrating a utility function with respect to a back-off time according to an exemplary embodiment.

FIG. 11 illustrates that a back-off time U is a utility function based on a channel gain. The utility function may be generated by modeling a random function to have a monotone-decreasing characteristic with respect to the channel gain.

Referring back to FIG. 10, in the operation 1007, where the RTS message is received from either at least two source nodes or the first relay node, each candidate node 1003 in the adjacent routing region estimates the channel gain with respect to each RTS message.

In the operation 1011, a node in which the timer operated based on the back-off time corresponds to 0 transmits the CTS message including the estimated channel gain to the source node (or the first relay node) 1001.

In the operation 1013, the source node (or the first relay node) 1001 transmits the packet to the node having transmitted the CTS message. In the operation 1015, the node having received the packet transmits an ACK message to the source node (or the first relay node) 1001.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of setting a packet transmission path in a wireless communication network, the method comprising:
   determining N number of hops based on a delay time permitted with respect to a packet to be transmitted, N denoting an integer greater than or equal to two;
   setting N−1 routing regions including at least one node between a source node and a destination node based on the number of hops;
   determining a node in the routing regions as a relay node based on an estimated channel gain which is based on a threshold;
   wherein the source node and the relay node set transmission power based on the predetermined N number of hops, the hop distance, and the distance from the center of each of the N−1 routing regions to the boundary.

2. The method of claim 1, wherein a ratio of a distance from a center of each of the N−1 routing regions to a boundary to a hop distance with respect to a packet to be transmitted is a value greater than 0 and less than 0.5.

3. The method of claim 1, further comprising: transmitting by either the source node or the relay node having received a packet transmitted from the source node, a control signal including coordinate information of the destination node to each node in an adjacent routing region; estimating a channel gain by a node having received the control signal; and determining the node having received the control signal in which the estimated channel gain is greater than a predetermined value, as a subsequent relay node.

4. The method of claim 3, wherein a size of the routing region is related to r=αd,
   where α is in a range of $0<\alpha<\frac{1}{2}$, r denotes a distance from a center $(x_1, y_1)$ of the routing region to a boundary and d denotes a hop distance where d and r are predetermined based on a required condition of the network.

5. The method of claim 1, wherein, the determining of the relay node comprises: transmitting by the destination node a Request To Send (RTS) functional message to each node in a routing region adjacent to the destination node; estimating a channel gain by each node having received the RTS functional message; and determining a node in which the estimated channel gain is greater than a predetermined value as the relay node.

6. The method of claim 1, wherein the wireless communication network is a multi-hop-based ad hoc network.

7. The method of claim 1 wherein the estimated channel gain is greater than the threshold in accordance with $\gamma_{TH,i} \triangleq \log m - \epsilon_i$, where m denotes a number of nodes existing in the routing regions.

8. A method of setting a packet transmission path to determine a relay node transmitting a packet between a source node and a destination node in a wireless communication network, the method comprising:
   determining N number of hops based on a delay time permitted with respect to a packet to be transmitted, N denoting an integer greater than or equal to two;
   setting N−1 routing regions including at least one node between a source node and a destination node based on the number of hops;
   transmitting, by either the source node or a first relay node transmitting the packet received from the source node, a Request To Send (RTS) message to nodes in the routing regions;
   determining a node having transmitted a Clear To Send (CTS) message as a second relay node, wherein the CTS message includes an estimated channel gain greater than a predetermined value, and a channel gain being estimated by each node having received the RTS message; and changing the predetermined value to compare a channel gain being estimated with the changed predetermined value;

wherein the source node and the relay nodes set transmission power based on the predetermined N number of hops, the hop distance, and the distance from the center of each of the N−1 routing regions to the boundary.

9. The method of claim 8, wherein the determining of the second relay node comprises determining the node having transmitted the CTS message as the second relay node in response to the CTS message being transmitted by a single node.

10. The method of claim 8, wherein in response to no node transmitting the CTS message, the predetermined value is changed so as to compare a channel gain being estimated with the changed predetermined value.

11. The method of claim 8, further comprising in response to at least two nodes transmitting the CTS message, receiving a retransmitted CTS message based on a probability value corresponding to the channel gain, from each node having transmitted the CTS message.

12. The network apparatus of claim 11, further comprising increasing the channel gain such that the probability value is set close to 1.

13. The method of claim 8, wherein where a node in the predetermined region receives the RTS message from either at least two source nodes or the first relay node, a channel gain with respect to each RTS message is estimated by the node receiving the RTS message from either the at least two source nodes or the first relay node, and where the estimated channel gain is greater than the predetermined value, the CTS message being transmitted includes identification information of either the source node having transmitted the RTS message or the first relay node.

14. A method of setting a packet transmission path to determine a relay node transmitting a packet between a source node and a destination node in a wireless communication network, the method comprising:

determining N number of hops based on a delay time permitted with respect to a packet to be transmitted, N denoting an integer greater than or equal to two;

setting N−1 routing regions including at least one node between a source node and a destination node based on the number of hops;

transmitting, by either the source node or a first relay node transmitting the packet received from the source node, a Request To Send (RTS) message to nodes located in the routing regions; and determining a node having first transmitted a Clear To Send (CTS) message as a second relay node, wherein the CTS message includes an estimated channel gain based on a back-off time corresponding to the estimated channel gain, and a channel gain being estimated by each node having received the RTS message;

wherein the source node and the relay nodes set transmission power based on the predetermined N number of hops, the hop distance, and the distance from the center of each of the N−1 routing regions to the boundary.

15. The method of claim 14, wherein where a node in the predetermined region receives the RTS message from either at least two source nodes or the first relay node, a channel gain with respect to each RTS message is estimated by the node receiving the RTS message from either the at least two source nodes or the first relay node, and the CTS message including identification information of either the source node having transmitted the RTS message or the first relay node, is transmitted based on the back-off time corresponding to the estimated channel gain.

16. The method of claim 14, wherein a channel model of the ad hoc network is defined in accordance with $$y_j = \sum_{i \in I} h_{ij} x_i + n_j \text{ where } h_{ij} = \frac{g_{ij}}{r_{ij}^{\gamma/2}}$$

Where $g_{ij}$ denotes a Raleigh fading channel in accordance with $E[|g_{ij}|^2]=1$ and $\gamma$ denotes a path loss exponent.

17. A wireless communication network apparatus comprising: a source node which determines a N number of hops based on a delay time permitted with respect to a packet to be transmitted and sets N−1 routing regions including at least one node between the source node and a destination node based on the number of hops;

a first relay node which receives coordinate information of a destination node from the source node, estimates a channel gain, and transmits a response message to the source node where the estimated channel gain is greater than a predetermined value; and a second relay node which receives a message from the destination node, estimates a channel gain, and transmits a response message to the destination node where the estimated channel gain is greater than a predetermined value;

wherein the source node and the relay nodes set transmission power based on the predetermined N number of hops, the hop distance, and the distance from the center of each of the N−1 routing regions to the boundary.

18. The network apparatus of claim 17, wherein the first relay node and the second relay node are respectively located in different predetermined routing regions based on the number of hops.

19. The network apparatus of claim 17, wherein the first relay node transmits the response message based on a back-off time corresponding to the estimated channel gain.

* * * * *